United States Patent [19]

Gaffney

[11] Patent Number: 4,892,166
[45] Date of Patent: Jan. 9, 1990

[54] MOTORIZED WHEELCHAIR ASSEMBLY HAVING COUPLING DEVICE

[76] Inventor: Edward J. Gaffney, N26 W27293 Hwy. SS, Pewaukee, Wis. 53072

[21] Appl. No.: 189,534

[22] Filed: May 3, 1988

[51] Int. Cl.$^4$ ............................................. B62D 61/00
[52] U.S. Cl. .................................. 180/208; 180/9.07; 280/7.1; 280/250.1; 403/363
[58] Field of Search ............... 280/7.1, 282, 287, 80 B, 280/250.1; 180/208, 906, 907; 403/363, 364, 377, 382

[56] References Cited

U.S. PATENT DOCUMENTS

| | | | |
|---|---|---|---|
| 2,696,272 | 12/1954 | Schlaphoff | 180/208 |
| 3,605,929 | 9/1971 | Rolland | 180/208 |
| 3,658,354 | 4/1972 | Read | 280/287 |
| 3,821,994 | 7/1974 | Bergius et al. | 180/190 |
| 3,945,449 | 3/1976 | Ostrow | 180/907 |
| 4,570,739 | 2/1986 | Kramer | 180/907 |
| 4,708,219 | 11/1987 | Cresswell | 180/907 |
| 4,757,868 | 7/1988 | Cresswell | 180/907 |

FOREIGN PATENT DOCUMENTS 608184 9/1948 United Kingdom ................. 280/7.1

Primary Examiner—Charles A. Marmor
Assistant Examiner—Eric Culbreth
Attorney, Agent, or Firm—Fuller, Puerner & Hohenfeldt

[57] ABSTRACT

A device for coupling a front wheel unit of a motorized wheelchair with a rear wheel unit to obtain an assembled motorized wheelchair. Generally the front wheel unit includes a wheel and handlebars or a steering wheel. The rear wheel unit includes at least a frame and a wheel rotatably connected to the frame. The coupling device includes a connector portion at the front end of the rear unit frame, which connector is generally vertically oriented but inclined forward slightly. The front wheel unit correspondingly has at its rear end a connector portion which is inclined forward at approximately the same angle as the rear connector, and sized and positioned so as to telescopically interfit with the rear connector. The coupling device further includes a horizontal transverse bar connected to the rear unit frame in front of the rear wheel, and a support frame connected to the rear end of the front unit and positioned so as to rest on the rear wheel unit frame bar when the front unit and rear unit connector portions have been telescopically interfitted together. The connector portions are generally square in cross-section, and may be oriented in one of two ways. Either two of the sides of the connector portion may be generally parallel to the fore-aft longitudinal axis of the wheelchair, or the diagonal of the square cross-section may be parallel to that longitudinal axis.

8 Claims, 3 Drawing Sheets

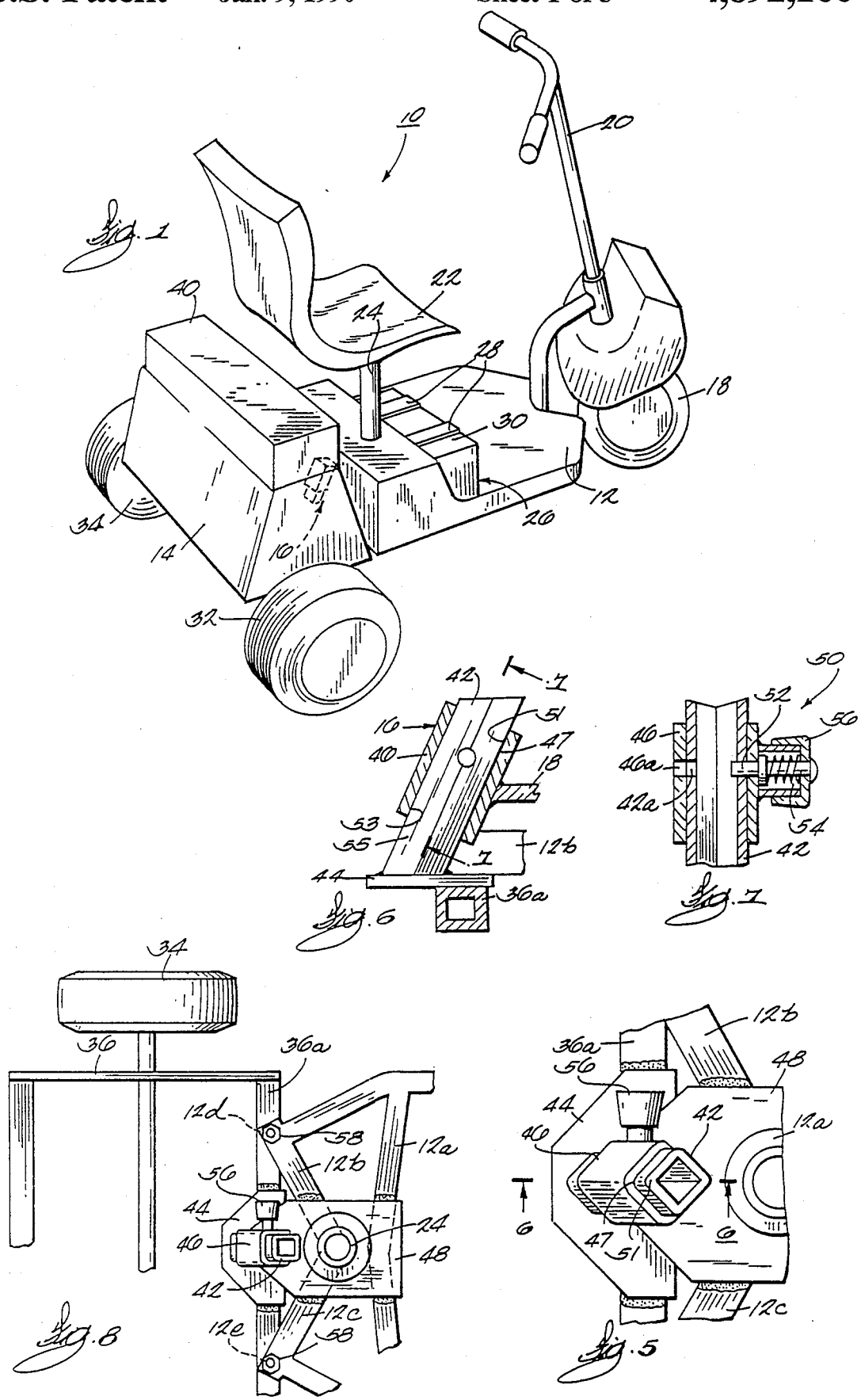

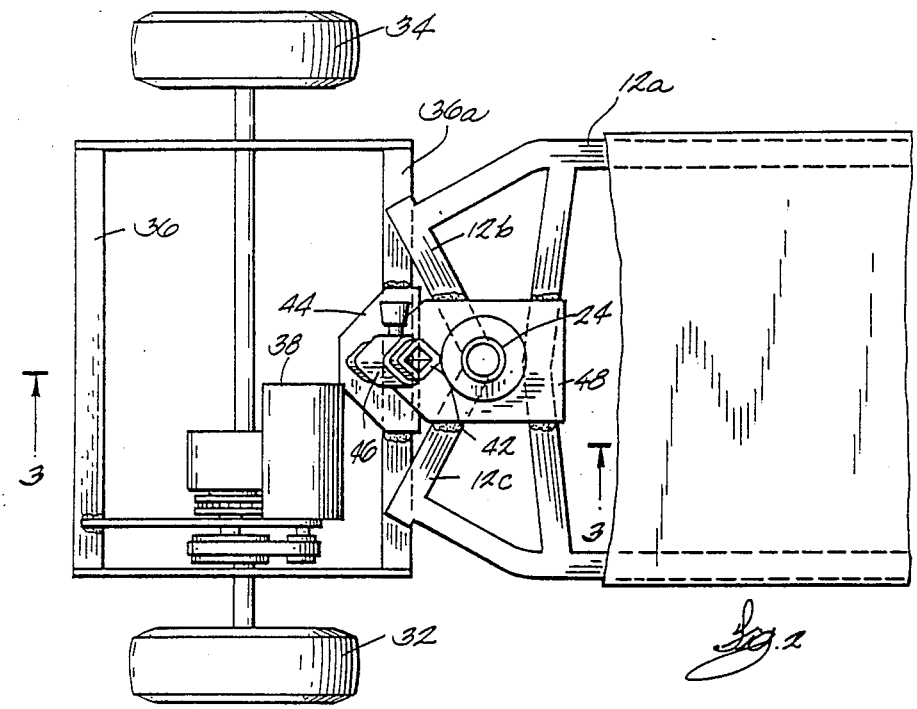
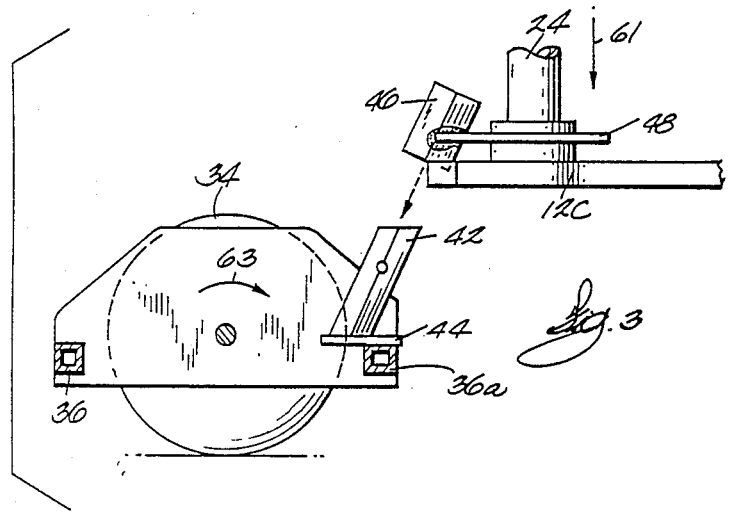
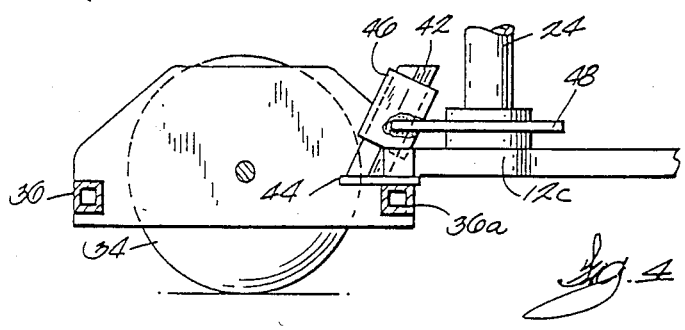

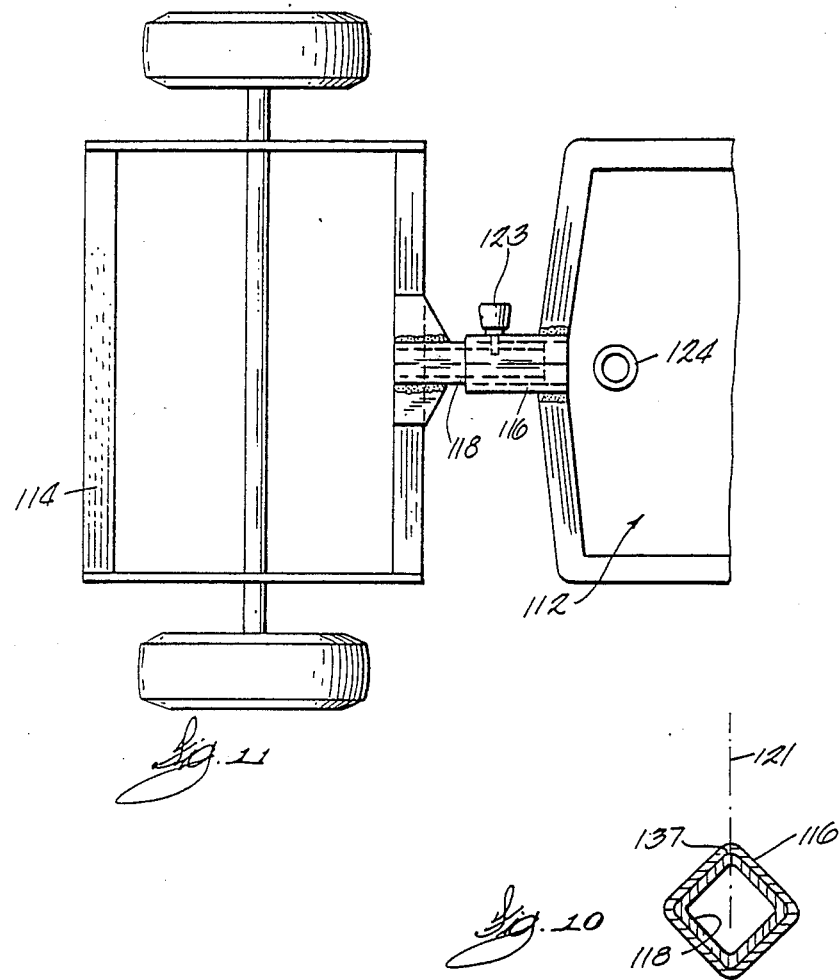
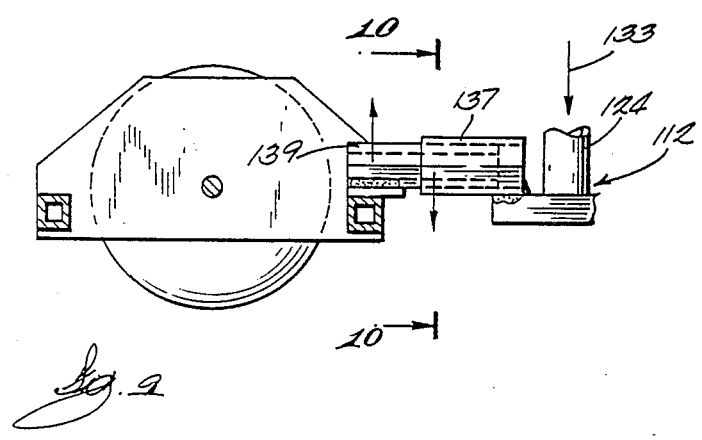

MOTORIZED WHEELCHAIR ASSEMBLY HAVING COUPLING DEVICE

BACKGROUND OF THE INVENTION

This invention relates to steerable motorized wheelchairs for the handicapped, and in particular to a novel and extremely useful means for removably coupling front wheel portions and rear wheel portions to obtain assembled wheelchairs having various different functions.

It is known to provide wheelchairs of the type generally having three wheels in a tricycle configuration, with the front wheel being steerable. It is further known to provide kits having different functions which, once assembled together, produce wheelchairs having a certain desired mix of functions, as described in co-pending U.S. application Ser. No. 917,404, assigned to the assignee of the present application, and the disclosure of which is incorporated herein by reference. For instance, one front unit may have a single wheel, and handlebars for steering that wheel. Another front unit may have two wheels, controlled by a steering wheel. To add yet other permutations, both the one- and two-wheel front units may be motorized or un-motorized. Similarly rear units, which would generally have two wheels, may carry a seat and/or a battery pack and/or be motorized. Further, the wheels may be of varying sizes, such as relatively larger for relatively rough terrain, or smaller for smoother surfaces and indoors. Clearly a dealer's inventory requirements are reduced if he can combine the various front units and rear units as needed rather than attempting to stock all the various assembled combintions.

Fortress Scientific, of Buffalo, N.Y., makes a three-wheel sheelchair with front and rear units that come apart to facilitate storage and transportation of the chairs, referring to it as the model 2000FS. This apparatus is not adapted, however, to connect interchangeable front and rear units.

Other apparatuses are also known which include front and rear wheel units which are detachable from each other. For instance, U.S. Pat. Nos. 3,605,929, 3,658,354, 3,945,449 and British Pat. No. 608,184 all show such devices. In all of the disclosed devices, however, no provision is made to prevent free play in the connection, resulting in disagreeable ride characteristics.

This invention relates to improvements over the devices described above and to solutions to the problems raised thereby.

SUMMARY OF THE INVENTION

The invention provides a device for coupling a front wheel unit of a motorized wheelchair with a rear wheel unit to obtain an assembled motorized wheelchair. Generally the front wheel unit includes a wheel and some means for steering that wheel, such as handlebars or a steering wheel. The rear wheel unit includes at least a frame and a wheel rotatably connected to the frame. According to the invention, the coupling device includes a connector portion at the front end of the rear unit frame, which connector portion is generally vertically oriented but inclined forward slightly, to an angle of about 25 degrees from the vertical. The front wheel unit correspondingly has at its rear end a connector portion which is inclined forward at approximately the same angle as the rear wheel unit connector portion, and sized and positioned so as to telescopically interfit with the connector portion of said rear wheel unit.

The coupling device further includes a horizontal transverse bar connected to the rear unit frame in front of the rear wheel, and a support frame connected to the rear end of the front unit and positioned so as to rest on the rear wheel unit frame bar when the front unit and rear unit connector portions have been telescopically interfitted together. The connector portions are generally square in cross-section, and may be oriented in one of two ways. Either two of the sides of the connector portion may be generally parallel to the fore-aft longitudinal axis of the wheelchair, or the diagonal of the square cross-section may be parallel to that longitudinal axis. In either case, locking means are provided to prevent relative movement of either of the connector portions with respect to the other once they have been telescopically interfitted together.

In the preferred embodiment one of the diagonals of the square tubing is on the fore aft axis so that when the vehicle is loaded with an occupant, loading forces press the front and rear corners of the inside tube on the rear unit against the corresponding corners of the outside tube on the front unit. This removes free play in the connection and binds the joint into a stiff coupling to eliminate chatter and vibration.

In a modified embodiment of the invention, the connection between the front and rear tubes is provided by telescopically related horizontal tubes, square in cross section. The diagonals of the squares are oriented on vertical and horizontal axes. When loaded, the corners of the inside tube bind in the corresponding corners of the outside tube to eliminate chatter and vibration.

Other objects and advantages of the invention will become apparent hereinafter.

DESCRIPTION OF THE DRAWING

FIG. 1 is an isometric view of a wheelchair assembled by employing the coupling device according to a preferred embodiment of the invention.

FIG. 2 is a top view of a portion of FIG. 1, partially cut away, showing a coupling device according to one embodiment of the invention.

FIG. 3 is a partially exploded cross-sectional view of FIG. 2, taken generally along line 3—3.

FIG. 4 is a cross-sectional view similar to FIG. 3, but assembled.

FIG. 5 is an enlarged view of a portion of FIG. 2, showing detail of the embodiment of the invention shown in FIG. 2.

FIG. 6 is a cross-sectional view of FIG. 5, taken generally along line 6—6.

FIG. 7 is a cross-sectional view of FIG. 6, taken generally along line 7—7.

FIG. 8 is a top view of a portion of FIG. 1, similar to FIG. 2, but showing a coupling device according to a different embodiment of the invention.

FIG. 9 is a fragmentary side elevational view of a modified embodiment of the invention with a horizontal coupling.

FIG. 10 is an enlarged sectional view along line 10—10 of FIG. 9.

FIG. 11 is a plan view of the modified embodiment of the invention shown in FIG. 9.

DESCRIPTION OF THE PREFERRED EMBODIMENT

Referring now to FIG. 1, there is shown a motorized wheelchair 10 in isometric, having a front unit 12 and a rear unit 14 connected together by means of a coupling device 16. Both the front unit 12 and the rear unit 14 may be configured variously to have different capabilities and functions. For instance, as shown in FIG. 1, the front unit 12 may have one wheel 18, with a set of handlebars 20 pivotably attached to a frame 12a of the front unit 12 for controlling the direction of that wheel. The front unit 12 may also include a seat 22 and a post 24 for attaching and supporting the seat on the front unit. A footrest area 26 may be provided between the handlebars 20 and the seat 22 for supporting the user's feet when the wheelchair 10 is in use. In addition, means 28 may be provided for holding batteries or other energy storage devices 30 on or in association with footrest area 26. The rear unit 14 may include two wheels 32 and 34 rotatably connected to a frame 36 (FIG. 2), a drive unit 38 for powering the wheels supported on the frame, and possibly additional batteries 40 (FIG. 1). Different front and rear units can thus be assembled together as long as each respective member contains its portion of the coupling device 16. Dealers may be provided with kits for assembling different types of front and rear units, resulting in wheelchairs having different capabilities, from fewer stock items than would normally be required.

The construction of the coupling device is important, however, because a poor coupling between front and rear units degrades the performance of the wheelchair. Free play in that coupling in particular has been a problem. The majority of the prior art couplings have simply a horizontal longitudinally slidable connection, with a pin. This arrangement has not solved the problem.

Referring now to FIGS. 2 through 7, the coupling device 16 according to the present invention includes a rear unit frame connector portion 42. The bottom end of rear connector 42 is affixed to a transverse bar 36a of the rear unit frame 36 by any suitable mounting means, such as a horizontal mounting plate 44 welded or otherwise permanently affixed to the top center of the bar 36a, with the rear connector 42 welded or otherwise permanently affixed to the top surface of the plate 44. The connector 42 is preferably formed of a length of square metal tubing, oriented generally vertically but preferably slanted forward to an angle of about 25 degrees from the vertical. In the most preferred embodiment, as shown best enlarged in FIG. 5 and also in FIG. 2, the connector 42 is oriented so that the diagonal of the square tubing is generally aligned with the longitudinal axis of the wheelchair 10. The reason for this slanting and diagonal orientation will be explained presently.

Similarly, the coupling device 16 includes a front unit frame connector portion 46. Front connector 46 is again preferably formed of square tubing, sized to just slide over and telescopically interfit with rear connector 42. Front connector 46 is affixed to the rear end of front unit frame 12a by any suitable mounting means, such as a horizontal mounting plate 48 attached to the frame 12a, with the front side of the front connector 46 welded or otherwise permanently affixed to the plate 48. As can be seen by comparing FIGS. 3 and 4, then, front unit 12 and rear unit 14 are connected together by telescopically sliding rear connector 42 into front connector 46.

One method of assembly would allow front connector 46 to slide onto rear connector 42 until it stopped, contacting mounting plate 44. However, reducing connection free play as much as possible is an important objective of the present invention. To that end, front frame 12a is provided with rearwardly projecting arms 12b and 12c, one at each side of the frame 12a, which are horizontally aligned with the rest of the frame. These arms 12b and 12c rest on the bar 36a of the rear frame 36 when the connectors 42 and 46 are assembled together, so as to provide further support.

Since the wheels 18, 32 and 34 of the wheelchair 10 are spaced apart from the connection between the units 12 and 14, when the vehicle 10 is loaded by an occupant on the seat 22 (FIGS. 1 and 3), a downward force represented by an arrow 61 (FIG. 3) will transmit the load to members 12b and 12c which will tend to rotate the rear unit forward as shown by an arrow 63. This tendency of the units to rotate toward each other causes the upper, front end of the V or corner 51 of the rear connector 42 to bind into the upper, front end of the V or corner 47 of the front connector 46 (FIG. 5), reducng connection free play. Correspondingly, as shown in FIG. 6, the lower, rear corner 55 of the rear connector 42 will bind within the lower, rear corner 53 of the front connector 46. The fact that the connectors 42 and 46 have their diagonals aligned with the longitudinal axis of the wheelchair 10 serves to further secure the bind when a load or weight is applied to the wheelchair. Improving the bind is also the reason that the connectors 42 and 46 are slanted forward to the above-mentioned angle of about 25 degrees. This angle reduces side to side motion of the connectors, and binds the joint into a stiff coupling to eliminate chatter and vibration.

Finally, to insure that the connectors 42 and 46 do not separate unintentionally, locking means 50 are provided for removably locking them together. While any suitable locking means may be employed, as shown best in FIG. 7, preferably the locking means 50 include apertures 46a in the front connector, matching aligned apertures 42a in the rear connector, and a pin 52 biased into the apertures by a spring 54. A handle 56 is provided, connected to the pin 52, for temporarily pulling the pin out of the apertures when the user wants to disengage the connectors 42 and 46 from each other.

Apparatus constructed according to another embodiment of the invention is shown in FIG. 8. In that embodiment, the connectors 42 and 46 are affixed to their respective mounting plates 44 and 48 so that two sides of the square tube connectors are generally parallel to the longitudinal axis of the wheelchair 10, rather than the diagonal of the square tubes being parallel to said axis as shown in the other figures. In this embodiment, apertures 12d and 12e are provided at the distal ends of the arms 12b and 12c, to allow the arms to be secured to the bar 36a, such as by bolts 58, in order to further prevent connection slop.

In a modified embodiment of the invention shown in FIGS. 9, 10 and 11, the connection between the front unit 112 and the rear unit 114 is provided by a telescopically related outer tube 116 on the front unit and a telescopically related inner tube 118 on the rear unit. As illustrated in FIG. 10, the diagonals of the tubes are oriented on a vertical axis 121. A cross pin and aperture locking means 123 holds the tubes in a coupled position. Locking means 123 may be similar to locking means 50, shown in FIG. 7 in connection with the embodiment there disclosed.

When the seat supporting post 124 (FIG. 9) is loaded, then, a downward force represented by an arrow 133 causes pressure points 137 at the top corners and pressure points 139 at the lower corners. This rigidifies the connection and eliminates side to side movement of the connectors as well as the chatter and vibration which could otherwise result from a loose connection.

While the apparatus hereinbefore described is effectively adapted to fulfill the aforesaid objects, it is to be understood that the invention is not intended to be limited to the specific preferred embodiment of motorized wheelchair having coupling device as set forth above. Rather, it is to be taken as including all reasonable equivalents within the scope of the following claims.

I claim:

1. A device for coupling a front wheel unit of a wheelchair including a wheel and means for steering the wheel, with a rear wheel unit of the wheelchair including a frame and a wheel rotatably connected to said frame, said coupling device comprising:
   a connector portion at a front end of said frame, which connector portion is generally vertically oriented but inclined forward slightly,
   said front wheel unit having at a rear end thereof a connector portion which is generally vertically oriented but inclined forward approximately the same as the rear wheel unit connector portion, said front wheel unit connector portion being sized and positioned so as to telescopically interfit with said connector portion of said rear wheel unit,
   said connector portions having four sides of substantially equal size such that said portions are substantially square in cross-section,
   a diagonal of said square cross-section of said connector portions being oriented generally parallel to the front-to-rear direction of the wheelchair.

2. A coupling device according to claim 1 further comprising locking means for locking said front wheel unit connector portion from movement with respect to said rear wheel unit connector portion after they have been telescopically interfitted together.

3. A coupling device as recited in claim 2 wherein said locking means includes a pin transversely slidably attached to one of said front wheel unit connector and said rear wheel unit connector and biased by spring means into engagement with a hole in the other of said connectors.

4. A coupling device according to claim 1 wherein said connector portions are inclined forward at an angle of about 25 degrees from the vertical.

5. The device according to any one of claims 1, 2, 3 or 4 including motor means mounted to said rear wheel unit and means operatively coupling said motor means to said wheel which is connected to the frame.

6. A kit for motorized wheelchairs adapted to provide different combinations of front wheel units and rear wheel units comprising:
   a plurality of selectively connectable front wheel units and rear wheel units, each unit having different characteristics and being selectable to suit the intended end use and user,
   said units including a front unit having a wheel and handlebars for steering said wheel, a motorized rear unit for combining with either of said single wheel or two wheel front units, a rear unit having two wheels and a motor means and a battery pack,
   each front wheel unit including a wheel and means for steering the wheel,
   each of said rear wheel units including a frame, a wheel rotatably connected to said frame, each of said rear wheel units including at a front end thereof a connector portion which is generally vertically oriented but inclined forward slightly,
   each of said front wheel units having at a rear end thereof a connector portion which is generally vertically oriented but inclined forward the same as the rear wheel unit connector portion, said front wheel unit connector portion being sized and positioned so as to telescopically interfit with said connector portion of said rear wheel units such that each of said front wheel units is connectable to any of said rear wheel units,
   said connector portions having substantially square cross-sections, respectively, defined by four substantially equal sides, and
   a diagonal of said square cross-section of said connector portions being oriented generally parallel to the front-to-rear direction of the wheelchairs.

7. A kit according to claim 6 further comprising locking means for locking said front wheel unit connector portion for movement with respect to said rear wheel unit connector portion after they have been telescopically interfitted together.

8. A kit according to claim 7 wherein said locking means includes a pin transversely slidably attached to one of said front wheel unit connector and said rear wheel unit connector and biased by spring means into engagement with a hole in the other of said connectors.

* * * * *